(12) United States Patent
Brown

(10) Patent No.: US 9,103,709 B2
(45) Date of Patent: Aug. 11, 2015

(54) OPTICAL SWITCH SYSTEM FOR A PROVER

(71) Applicant: Michael D. Brown, Phoenix, AZ (US)

(72) Inventor: Michael D. Brown, Phoenix, AZ (US)

(73) Assignee: Flow Management Devices, LLC, Phoenix, AZ (US)

( * ) Notice: Subject to any disclaimer, the term of this patent is extended or adjusted under 35 U.S.C. 154(b) by 248 days.

(21) Appl. No.: 13/889,850

(22) Filed: May 8, 2013

(65) Prior Publication Data

US 2014/0331738 A1 Nov. 13, 2014

(51) Int. Cl.
*G01J 1/42* (2006.01)
*G01D 5/32* (2006.01)
*G01D 5/34* (2006.01)
*G01F 25/00* (2006.01)

(52) U.S. Cl.
CPC .................................. *G01F 25/0015* (2013.01)

(58) Field of Classification Search
CPC ............ G01D 5/32; G01D 5/34; G01D 5/342
USPC ............. 250/231.11; 356/445–448, 614–624, 356/213, 218–219
See application file for complete search history.

(56) References Cited

U.S. PATENT DOCUMENTS

RE31,432 E * 11/1983 Francisco, Jr. ................. 73/1.21
5,567,953 A * 10/1996 Horinouchi et al. .......... 250/551
2010/0223976 A1 * 9/2010 Jakubenas ...................... 73/1.16
2012/0186323 A1 * 7/2012 Weaver ............................ 73/1.16
2013/0253872 A1 * 9/2013 Curtis et al. ................... 702/100

* cited by examiner

Primary Examiner — Renee D Chavez
(74) Attorney, Agent, or Firm — The von Hellens Law Firm, Ltd.

(57) ABSTRACT

Apparatus for flow prover precisely measures the volume and the flow rate of a fluid through a cylinder. The prover includes a piston within a cylinder supporting a shaft extending longitudinally through the cylinder, which cylinder receives and discharges the fluid by translation of the piston from the fluid receiving end to the fluid discharging end. Motive means draws the shaft and piston toward the fluid receiving end of the cylinder. Travel of the piston in the direction from the fluid receiving end to the fluid discharging end of the cylinder is sensed at discrete locations to provide an indication of the volume of fluid therebetween and the related flow rate. Each of a plurality of emitter/detector modules provides piston position sensing signals reflective of the volume and rate of fluid flowing through the cylinder. A switch bar rigidly and permanently fixes the position of the emitter/detector modules with respect to the piston and with respect to one another. An immovable gate or aperture regulates the cross-section of the light beam striking the detector and ensures that the measured volume is repeatable and cannot be altered due to external factors such as in-field use, service, maintenance on components or the like.

5 Claims, 5 Drawing Sheets

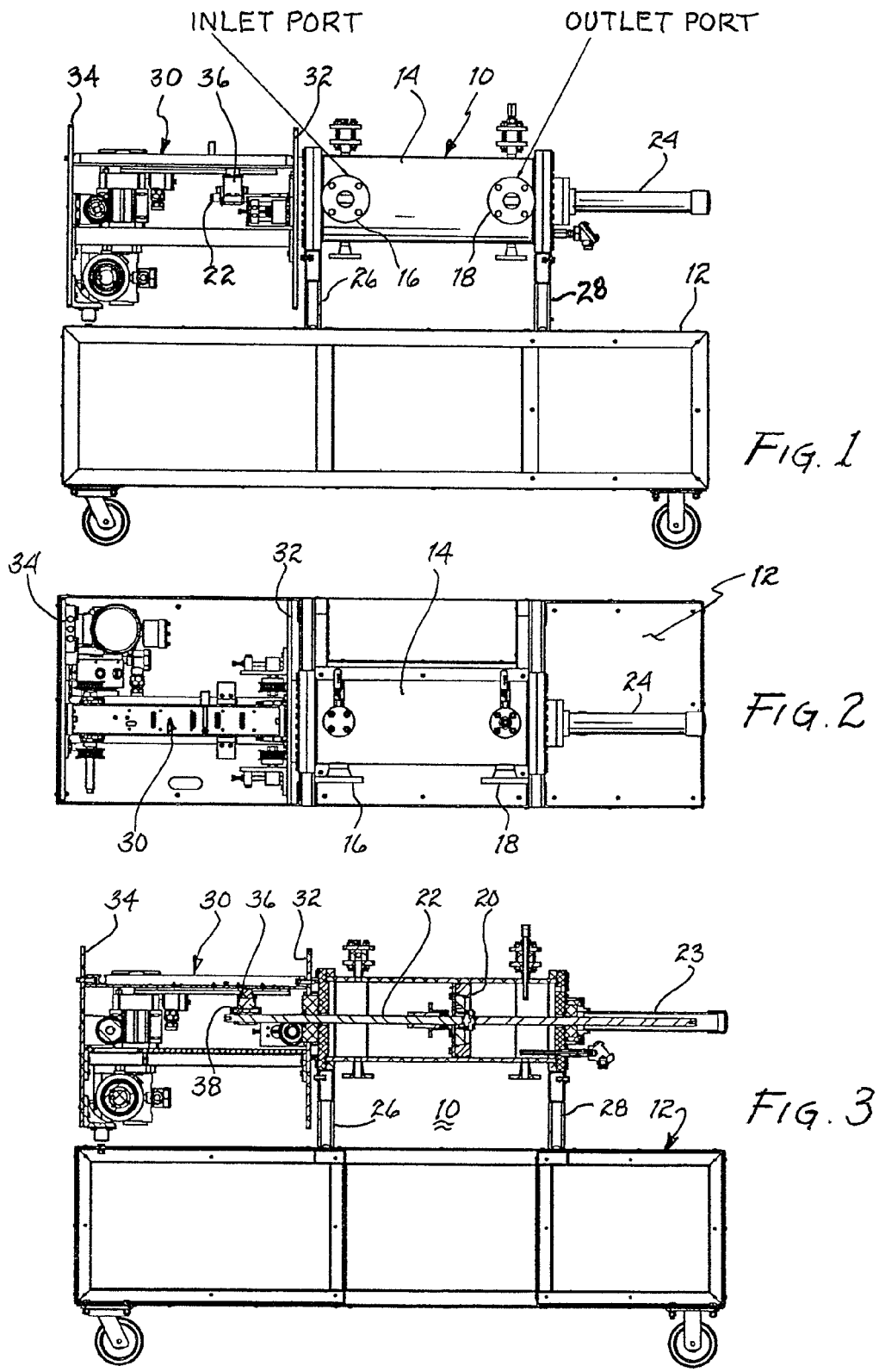

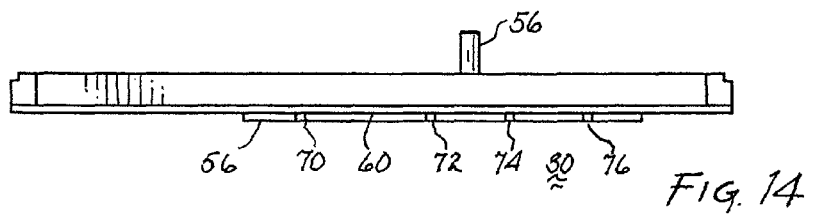
FIG. 14
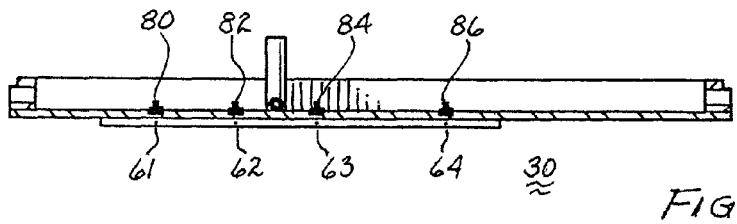
FIG. 15
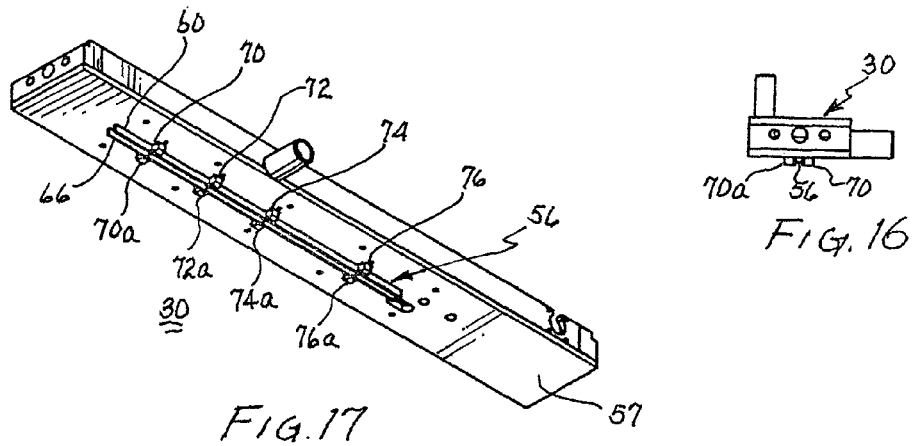
FIG. 16
FIG. 17
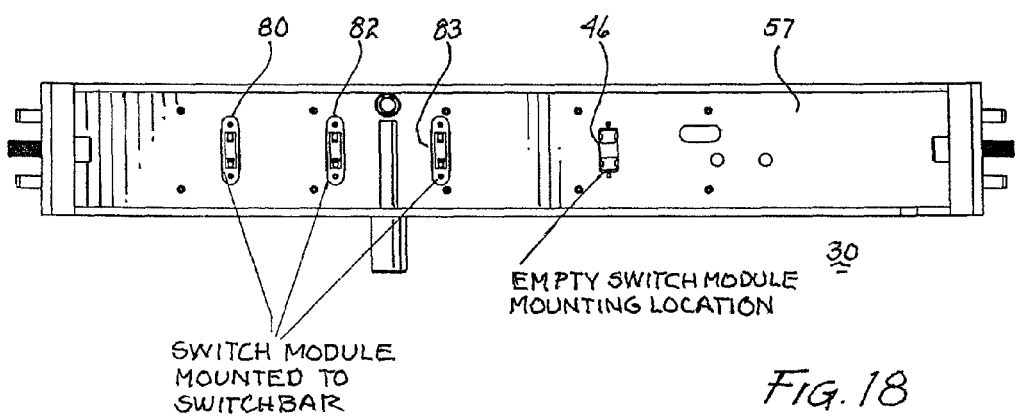
SWITCH MODULE MOUNTED TO SWITCHBAR
EMPTY SWITCH MODULE MOUNTING LOCATION
FIG. 18

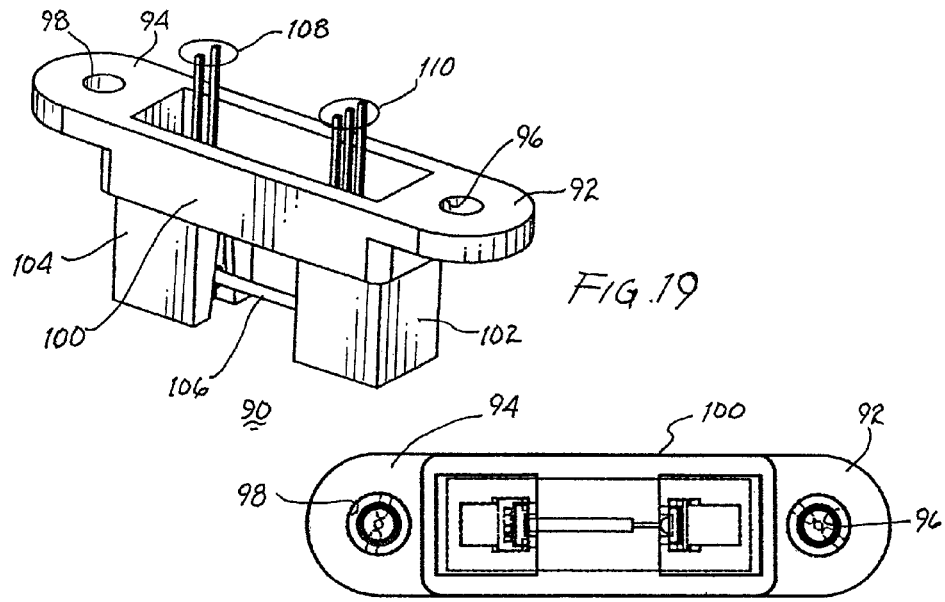
FIG. 19
FIG. 20
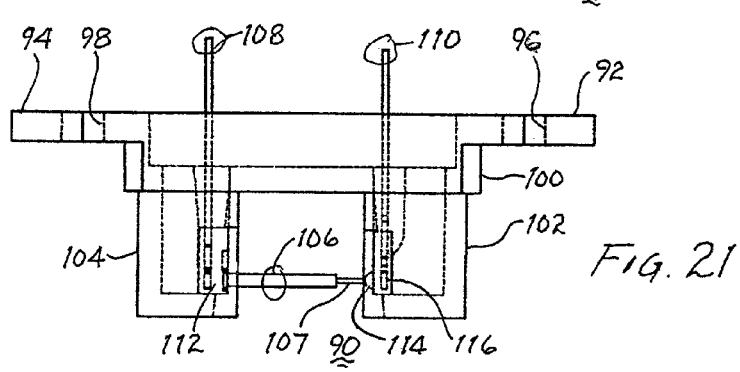
FIG. 21
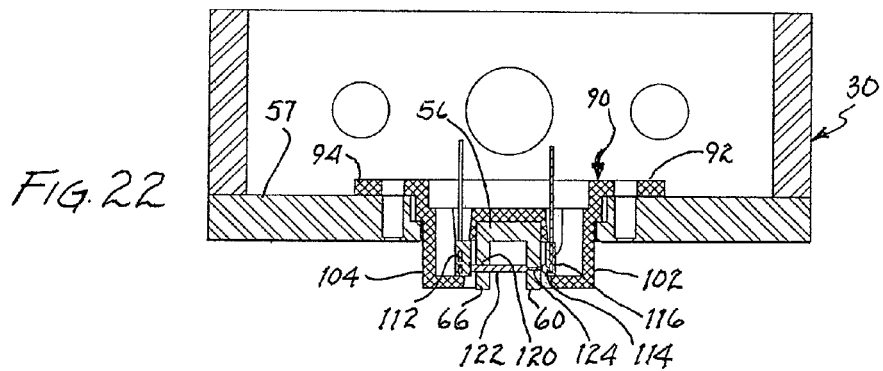
FIG. 22

OPTICAL SWITCH SYSTEM FOR A PROVER

BACKGROUND OF THE INVENTION

1. Field of the Invention

The present invention is related to determination of volume and flow rate of a fluid through a prover and, more particularly, to precise detection of the position of the piston within a prover during translation of the piston within the cylinder.

2. Description of Related Prior Art

A purpose of a prover is to precisely determine the volume of fluid flowing therethrough. As a result, the measurements relating to such volume of fluid must be extremely precise. To achieve this end, fluid flows in one end of a cylinder, which cylinder includes a piston rectilinearly translatable from a location proximate one end of the cylinder to a location proximate the other end of the cylinder. The cylinder is generally precision machined and honed to provide the high level of sealing required for precision measurement. The piston may incorporate a flow through, or poppet type apparatus to permit bypass of the fluid after the measurement portion of the translation. After translation of the piston, the fluid flows out of the other end of the cylinder. The piston is supported upon a shaft extending through seals and bearings at each end of the cylinder.

Conventional small volume provers for calibrating a liquid flow meter with respect to the measurement of a fixed volume typically utilize two or more fixed position optical slot sensors located on the stationary frame of the small volume prover. A mechanical feature, or flag, rigidly mounted to the shaft of the piston passes through these optical slot sensors. The flag breaks the path between the light emitter and light sensor and triggers a signal that indicates the position of the piston. Calibrated volumes may be determined between the positions of any subset of two of the total set of optical slot sensors. The exact known traceable volume between any two such switches is determined through a gravimetric water draw process. Such small volume provers can measure the average piston velocity based on the amount of time (e.g., a time delta) between the signals from any two optical sensors. The time delta and the known volumes can provide the average flow rate on each pass. Unfortunately, such optical sensors are difficult to align and require very precise placement, which adds cost and complexity to the prover manufacture and installation. If such optical sensors are misaligned, the moving shaft mounted flag may hit and destroy the optical sensors.

The known, measured, traceable, or "proved" volume is repeated on every pass of the piston or "prove" by signaling pulses as the flag crosses the optical slot sensors. A common problem in such prior art small volume provers is that the position of the gate or slot is integral to each optical sensor switch, and therefore subject to move with the switch itself. A switch may need to be removed and replaced for a variety of reasons such as replacement due to failure, scheduled maintenance, troubleshooting, access to other components, and inspection. If a switch is removed or replaced with the same switch or a different switch, the position of the location gate or slot is likely to have changed. This may be due to the inability to place the switch back into exactly the same location within the housing, due to a change of the location of the slot housing of the switch, or both. The location of the switch can change without the switch having been removed by an external force such as the wires being pulled, the switch being hit or pressed by a force from thermal cycling or vibration over time. Any movement of the location of any of the gates or slots results in a potential change in the distance between them, which necessitates a recalibration of the known volumes. This is an expensive and time-consuming process.

SUMMARY OF THE INVENTION

A small volume prover is used to measure the accuracy of a flow meter that is used to measure the flow of a fluid. The prover includes a piston within a cylinder supported on a shaft extending from opposed ends of the piston. As a fluid enters the input end of the cylinder, the piston is caused to travel to the output end wherein the fluid is discharged. The movement of the piston results in commensurate rectilinear translation of the shaft. A switch bar, rigidly secured to the frame supporting the prover, includes two or more sensors. A flag attached to the shaft translates past these sensors commensurate with rectilinear translation of the shaft. As the flag passes a sensor, a signal is triggered reflective of the position of the piston within the cylinder. As the distance between the sensors is known along with the amount of volume of fluid within the cylinder between the respective locations of the piston, the volume can be correlated with the volume of fluid reflected by the flow meter under test. Moreover, the rate of flow of fluid within the prover can also be determined and correlated with the flow meter under test. To obtain a high level of accuracy the switch modules are precisely mounted in the switch bar, which accommodates replacement with little fear of misalignment or repositioning. Positional precision is obtained by directing a beam of light from an emitter through a very small aperture at a fixed location to a detector having a sensing area significantly greater than the cross-section of the aperture. As the flag moves past the switch module, the detector will trigger and reflect the passage of the flag only when the very small diameter light beam is interrupted. Any minor change in location of the emitter or detector (switch module) will not compromise the positional accuracy of detection of the position of the shaft and piston each time the detector is triggered.

It is therefore a primary object of the present invention to provide an accurate small scale prover for precisely calibrating a flow meter.

Another object of the present invention is to provide detection apparatus for precisely determining position of a piston within a cylinder of a prover.

Another object of the present invention is to provide a switch bar for supporting a plurality of detectors for detecting the passage of a flag mounted on the shaft of a prover.

Still another object of the present invention is to provide switch modules mountable on a switch bar operatively associated with the shaft of a prover and without requiring re-calibration of the prover.

Yet another object of the present invention is to provide a switch bar associated with a prover for supporting a plurality of the switch modules having a light emitter and detector for triggering a signal upon passage of a flag through a small cross-section light beam at a fixed location on the switch bar.

A further object of the present invention is to provide an immovable fixed small sized aperture for reducing the cross-sectional area of a light beam striking a detector.

A still further object of the present invention is to provide a switch bar supporting a plurality of light emitter and detector modules wherein each emitter provides a light beam of significantly greater cross-sectional area than the cross-sectional area of the light beam passing through a fixed small cross-sectional area aperture to the detector.

A yet further object of the present invention is to provide a fixed position aperture for defining the trigger point of a flag passing through a light beam between an emitter and a detector.

A yet further object of the present invention is to provide a method for accurately determining positions of a piston within a prover during testing of an ancillary flow meter.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a small scale prover mounted on a movable stand;

FIG. 2 is a top view of the small scale prover;

FIG. 3 is a partial cross-sectional view of the small scale prover;

FIG. 14 is a side elevational view of the switch bar with the emitter/detector modules installed;

FIG. 15 is a cross-sectional view of the switch bar;

FIG. 16 is an end view of the switch bar shown in FIG. 14;

FIG. 17 is a bottom isometric view of the switch bar shown in FIG. 14;

FIG. 18 is a top view of the switch bar with some emitter/detector modules installed thereon;

FIG. 19 is an isometric view of an emitter/detector module;

FIG. 20 is a bottom view of the emitter/detector module;

FIG. 21 is a partial cross-sectional view of the emitter/detector module; and

FIG. 22 is a cross-sectional view illustrating the emitter/detector module mounted in the switch bar.

DESCRIPTION OF THE PREFERRED EMBODIMENT

Figure 4:
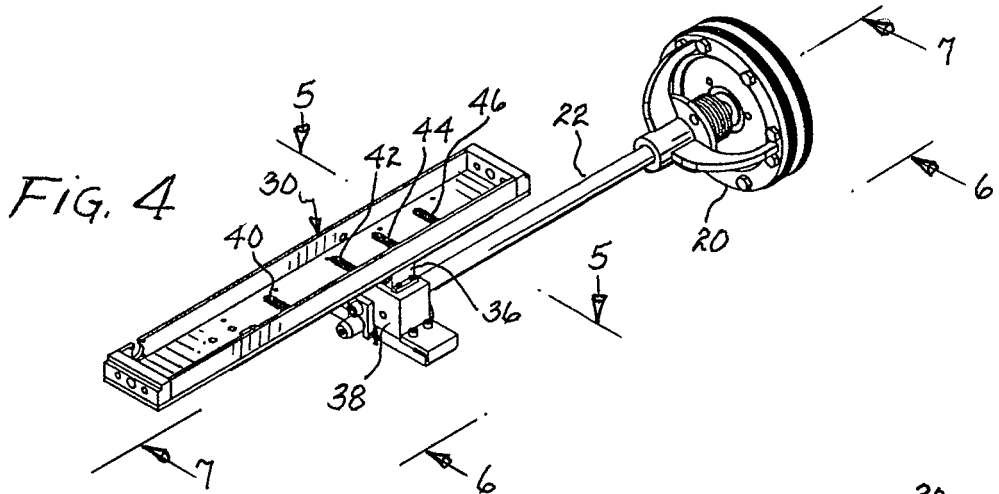
FIG. 4 illustrates the piston located within the cylinder of the prover along with its supporting shaft, flag and switch bar.

Referring to FIGS. 1, 2 and 3, there is shown a small scale prover 10 mounted on a transportable platform 12. The prover includes a cylinder 14 having an inlet port 16 and an outlet port 18. A piston 20 (see FIG. 3 etc.) is supported upon a rectilinearly translatable shaft 22. One end of the shaft is located within a protective sleeve 24. The supports 26, 28 support prover 10 on platform 12. A switch bar 30 is rigidly mounted on plates 32, 34 attached to the prover structure. A flag 36 is supported by a fixture 38 attached to shaft 22.

Referring jointly to FIGS. 4, 5, 6 and 7, details attendant the relationship between shaft 22 and switch bar 30 will be described. Shaft 22 is rigidly attached to piston 20 whereby translatory movement of the piston is reflected by commensurate rectilinear translation of the shaft. Movement of the shaft produces identical movement of fixture 38 and flag 36 attached thereto. Thereby, the position of flag 36 relative to switch bar 30 is identical with movement of piston 20.

Figure 5:
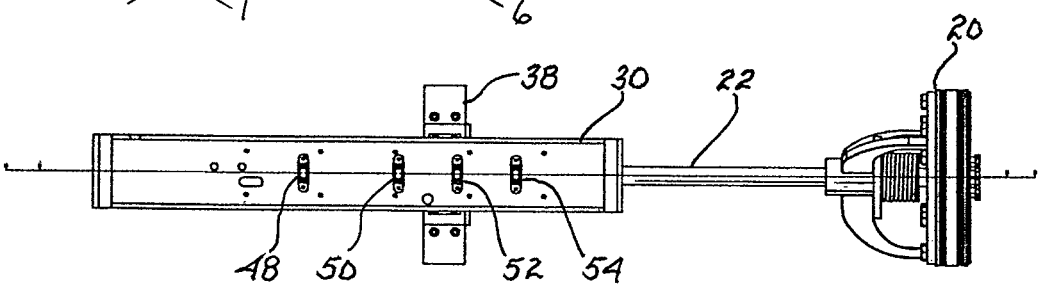
FIG. 5 is a top view taken along lines 5-5, as shown in FIG. 4.
Figure 6:
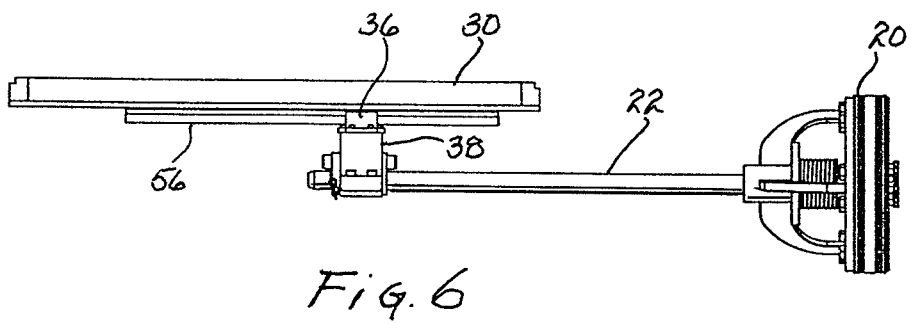
FIG. 6 is an elevational view taken along lines 6-6, as shown in FIG. 4.
Figure 7:
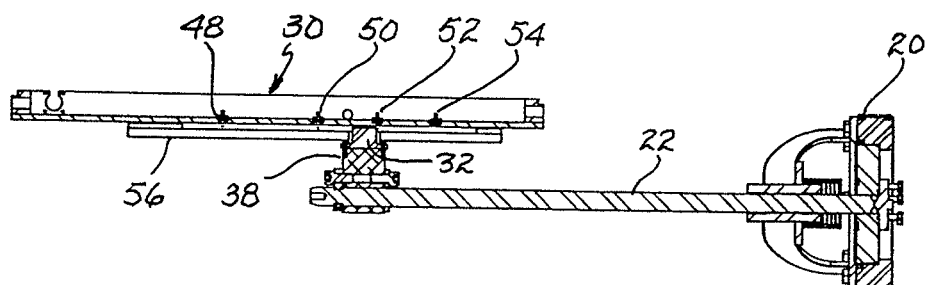
FIG. 7 is a cross-sectional view taken along lines 7-7, as shown in FIG. 4.
Figure 9:
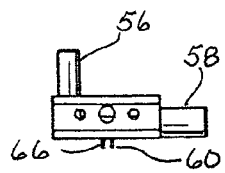
FIG. 9 is an end view of the switch bar.
Figure 8:
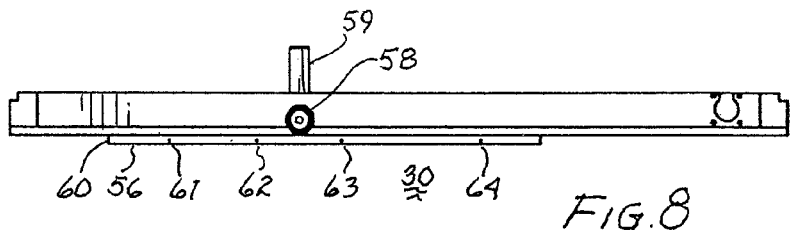
FIG. 8 is a side elevational view of the switch bar.
Figure 10:
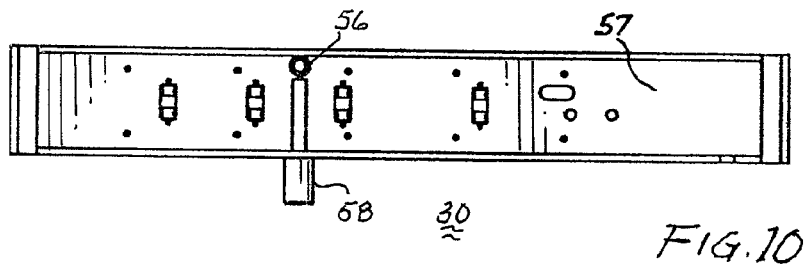
FIG. 10 is a top view of the switch bar.

The switch bar includes a plurality of precisely machined apertures 40, 42, 44, and 46. Two or more of these apertures relatively precisely support two or more light emitter detector modules 48, 50, 52 and 54, as illustrated in FIGS. 5 and 7. A channel 56 extends along essentially the center line of the bottom 57 of switch bar 30. To ensure lack of positional change of this channel relative to the switch bar, it may be formed as part of the switch bar. Alternatively, it may be attached by welding or other permanent non-adjustable means. As shaft 22 translates due to axial movement of piston 20, flag 36 travels within and along channel 56.

Referring jointly to FIGS. 8, 9, 10, 11, 12 and 13, further details attendant switch bar 30 will be described. As the use of prover 10 (see FIG. 1) mandates precise measurements to be obtained from switch bar 30, housings 58, 59 may be used to mount temperature sensing elements. Thereby, any change in length of the switch bar can be determined due to a change in temperature and with knowledge of the coefficient of elongation of the material of which the switch bar is made. Thereafter, appropriate calculations for determining the precise volume and rate of flow within the prover between two or more positions of the piston may be calculated.

As set forth above, channel 56 is permanently attached to bottom 57 of switch bar 30 to prevent any movement of the channel relative to the switch bar. For reasons set forth in detail below, one wall 60 of channel 56 includes a plurality of small diameter apertures 61, 62, 63 and 64. Correspondingly positioned much larger diameter apertures are disposed in wall 66 of channel 56 (see FIG. 9).

Figure 11:
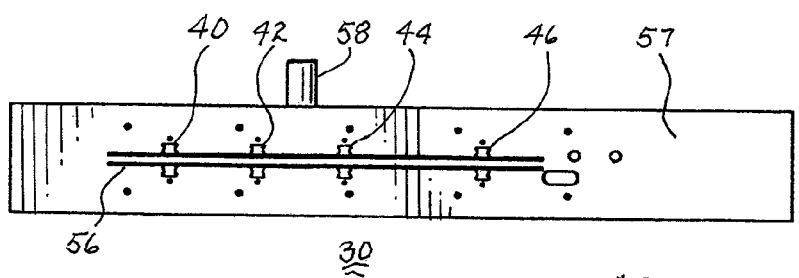
FIG. 11 is a bottom view of the switch bar.
Figure 12:
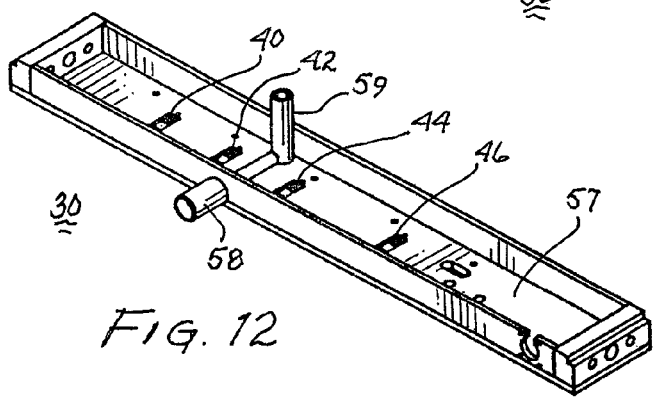
FIG. 12 is an isometric top view of the switch bar.
Figure 13:
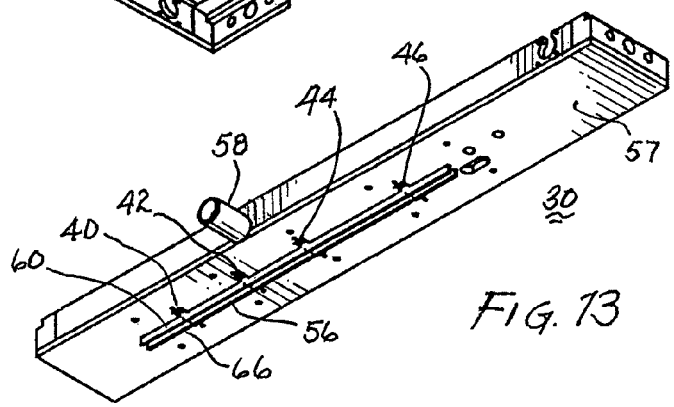
FIG. 13 is an isometric bottom view of the switch bar.

As particularly shown in FIGS. 11 and 12, a plurality of openings or slots 40, 42, 44 and 46 are disposed in bottom 57 of switch bar 30. As illustrated, the slots straddle channel 56. Furthermore, the position of each of these slots is essentially centered upon a corresponding one of apertures 61, 62, 63 and 64 shown in FIG. 8.

Referring jointly to FIGS. 14, 15, 16, 17 and 18, switch bar 30 is shown with the light emitter/detector modules mounted therein. As described above, channel 56 is rigidly attached to bottom 57 of switch bar 30. Each of the light emitter/detector modules is placed within one of apertures 40-46 (see FIGS. 11 and 12). Each of these modules includes two depending legs that, in essence, straddle channel 56. As particularly shown in FIG. 14, legs 70, 72, 74 and 76 are adjacent wall 60 of channel 56. FIG. 15 is a cross-section of the switch bar and illustrates modules 80, 82, 84 and 86 mounted in apertures 40, 42, 44 and 46 (as shown in FIG. 11). Each of these modules corresponds with a respective one of apertures 61, 62, 63 and 64 in wall 60 of channel 56. As particularly shown in FIGS. 16 and 17, pairs of legs 70 and 70a, 72 and 72a, 74 and 74a, and 76 and 76a, extend downwardly along walls 60 and 66 of channel 56. FIG. 18 is a top view of the switch bar and illustrates modules 80, 82 and 83 mounted within slots 40, 42 and 44 (as shown in FIG. 12). Slot 46 does not include a module.

Referring jointly to FIGS. 19, 20 and 21, a representative light emitter/detector module 90 will be described. The module includes a pair of laterally extending ears supported upon base 57 of switch bar 30. Apertures 96, 98 accommodate passage of a bolt for threaded engagement with the base of the switch bar to rigidly secure the module with the switch bar. Central section 100 of the module conforms in plan form with one of apertures 40, 42, 44 or 46 in the base of the switch bar, which apertures are shown in FIG. 12 and the mounting of the modules is shown in FIG. 18. Legs 102, 104 straddle and extend along channel 56, as illustrated in FIG. 17. Leg 104 may include a light emitter for emitting a beam of light, as represented by cylinder 106. Leg 102 supports a light detector for detecting a light beam of reduced diameter, as represented by cylinder 107 (shown in FIG. 21). Electrical conductors 108 provide power to the light emitter and electrical conductors 110 provide power to the light detector and one of the conductors provides a signal indicative of a lack of light impinging upon the detector.

As shown in FIG. 21, light emitter 112 generates a beam of light represented by cylinder 106 directed to light sensor 114 of light detector 116. As illustrated, the light beam is initially of a relatively large cross-sectional area. The cross-sectional area of the light beam is subsequently reduced, as representatively illustrated by the two cylinders of different diameter.

FIG. 22 illustrates emitter/detector module 90 mounted in base 57 of switch bar 30. As discussed above, channel 56 is rigidly a part of switch bar 30 either because it is formed as part of the light bar or is welded or otherwise permanently attached to the light bar to prevent the possibility of any movement between the channel and the light bar. As discussed above, legs 102, 104 straddle channel 56. Wall 66 of the channel has a relatively large aperture or hole 120 formed therein and coincident with the point of light emission of the light emitter. This produces a light beam 122 commensurate with the diameter or cross-section of hole 120. Wall 60 includes a hole 124 corresponding with the above-described apertures 61, 62, 63 and 64. The diameter or cross-section of this hole is significantly smaller than that of hole 120. Thereby, the cross-section of the light beam impinging upon light sensor 114 of light detector 116 is relatively small. In fact, the cross-section is significantly smaller than the sensing area of the light sensor. Benefits of such a small cross-sectional area of the light beam impinging upon the light sensor will be discussed below.

From time to time, it may become necessary to replace an emitter/detector module. During mounting of a replacement emitter/detector module, it may not be precisely in the same position as the emitter/detector module being replaced. Were no other safeguard present to ensure precise positioning, the positional integrity of the flag interrupting the light beam could or would be compromised. By using a hole 124 which is at a known position relative to the switch bar and which will remain permanently in a fixed position, such compromise would never occur. That is, the light sensor in the light detector has a certain area wherein light detection will occur. Provided that the emitter/detector module is positioned sufficiently accurately to locate the light sensor such that one part or another of it is coincident with hole 124, a signal reflective of the passing of the flag will always occur at the identical position of the flag. Thereby, there can be movement of a replacement emitter/detector module relative to the replaced emitter/detector module and such movement will not compromise the position at which the flag will interrupt the light beam and detection of such position of the flag.

While only one position of an emitter/detector module on the switch bar has been described, it is to be understood that each of the positions illustrated operates in exactly the same manner. By obtaining such positional accuracy, the laborious and time-consuming present procedures for recalibrating a switch bar each time a component thereof is replaced for repair or maintenance purposes has been completely avoided. Moreover, the likelihood of positional compromise in generating a signal as the flag and the shaft supporting piston travels along the switch bar is eliminated.

I claim:

1. Apparatus for precisely determining the position of a piston supported on a shaft within a prover during translation of the piston and shaft within the cylinder, said apparatus comprising:
   (a) a switch bar rigidly mounted with respect to the prover, said bar including a plurality of precisely located slots;
   (b) a channel having a pair of walls and being permanently attached to said switch bar for accommodating passage of a flag, mounted on said shaft, between said walls;
   (c) a light emitter/detector module detachably mounted within at least some of said plurality of slots and straddling said channel;
   (d) each said module including a light emitter disposed on one side of said channel for emitting a light beam and a light detector disposed on the other side of said channel for detecting the presence and absence of the light beam; and
   (e) said channel being disposed in the light path between said light emitter and said light detector, said channel including a first aperture disposed in one wall for sizing the cross-section of the light beam emitted by said light emitter and a second aperture disposed in the other wall for reducing the cross-sectional size of the light beam impinging upon said light detector to accurately correlate the position of the shaft and piston with the precise moment said flag interrupts the light beam.

2. The apparatus as set forth in claim 1 wherein said light emitter and said light detector are part of a module fixedly positioned relative to one another to prevent any movement therebetween.

3. The apparatus as set forth in claim 2 wherein said module is configured to precisely mate with one of said slots to prevent any movement of a mated module and the corresponding slot of said plurality of slots.

4. The apparatus as set forth in claim 3 including a plurality of said modules mated with corresponding ones of said plurality of slots to sense travel of said flag along said switch bar.

5. A method for precisely determining the volume and flow rate of a fluid passing through a prover, said method comprising the steps of:
   (a) locating a switch bar proximate to and in fixed relationship with the prover;
   (b) precisely mounting at least one light emitter/detector module comprising a light emitter and a light detector on said switch bar for determining passage of a flag secured to a piston supporting shaft past the module, said step of mounting including locating the light emitter adjacent one wall of a channel on the switch bar and locating the light detector on the other wall of the channel;
   (c) defining the cross-section of the light beam emitted by the light emitter by a first aperture in the one wall of the channel;
   (d) defining the cross-section of the light beam detected by the light detector by a second aperture in the other wall of the channel, which second aperture is smaller in cross-section than the first aperture; and
   (e) transporting the flag along the channel as a function of translation of the shaft.

\* \* \* \* \*